United States Patent [19]
Bontinick

[11] 3,879,492
[45] Apr. 22, 1975

[54] HEAT-SEALABLE FILM CAPABLE OF FORMING PEELABLE SEALS

[75] Inventor: Walter Bontinick, Saint Martens-Leerne, Belgium

[73] Assignee: UCB, S.A., Saint-Gilles-lez-Bruxelles, Belgium

[22] Filed: May 15, 1972

[21] Appl. No.: 253,113

[30] Foreign Application Priority Data
May 18, 1971 United Kingdom............... 15587/71

[52] U.S. Cl.............. 260/857 D; 161/190; 161/214; 161/216; 161/217; 161/220; 161/247; 161/253; 260/37 N; 260/42; 260/42.21; 260/45.7 P; 260/45.95; 260/888; 260/889; 260/42.29; 260/857 L; 260/888; 260/889; 260/897 A; 260/897 C

[51] Int. Cl............................................ C08g 41/04

[58] Field of Search............ 260/857 L, 857 D, 889, 260/897 A

[56] References Cited
UNITED STATES PATENTS

| | | | |
|---|---|---|---|
| 2,631,954 | 3/1953 | Bright | 260/889 |
| 3,093,255 | 6/1963 | Mersobian | 260/857 L |
| 3,163,683 | 12/1964 | Salyer | 260/889 |
| 3,192,288 | 6/1965 | Sayko | 260/897 A |
| 3,373,223 | 3/1968 | Armstrong | 260/857 L |
| 3,407,253 | 10/1968 | Yoshimura | 260/889 |
| 3,546,319 | 12/1970 | Prevorsek | 260/857 D |
| 3,642,948 | 2/1972 | Bauer | 260/889 |
| 3,652,725 | 3/1972 | Diaz | 260/897 A |

*Primary Examiner*—Paul Lieberman
*Attorney, Agent, or Firm*—Wenderoth, Lind & Ponack

[57] ABSTRACT

Wrapping films capable of forming peelable seals, comprising by weight 20 to 80% of heat-sealable rigid polymers (A) which, in film form, have an elasticity modulus in excess of 3000 kg/cm$^2$, measured according to the ASTM D 88227 standards; 0.1 to 50% of non-heat-sealable polymers (B) which do not form a solution with polymer (A); 0.1 to 30% of heat-sealable branched olefinic polymers (C) which, in film form, have an elasticity modulus below 3000 kg/cm$^2$, measured according to the ASTM D 88227 standard; and 0 to 45% of polymers (D) compatible with polymers (A), (B) and (C), the sum of the polymers (A), (B), (C) and (D) representing 100% of the polymer material of the film, to which up to 45% of additives (E) and/or up to 10% of adjuvants (F) conventional for wrapping films may be added and process for the preparation thereof.

5 Claims, No Drawings

HEAT-SEALABLE FILM CAPABLE OF FORMING PEELABLE SEALS

The present invention is concerned with a heat-sealable packing film capable of forming a peelable seal, said seal being achievable either between two films of this kind, or between one film of this kind and another packing film of any other kind.

In the following, by peelable seal, there is to be understood the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packing during storage and transport until such time as the packing is opened by the user of the packed article. However, the mechanical resistance of the peelable seal must be low enough to permit ready manual opening of the joint, i.e. without the use of any auxiliary instrument.

As is known, the present tendency is to protect by wrapping the most diverse commercial products, such as instruments, foodstuffs, for example, fruit, vegetables, meat and the like, the wrapping being composed of flexible transparent or opaque films. As materials for the manufacture of these films, use has been made of macromolecular substances, for example, varnished regenerated cellulose, polyethylene, polypropylene, ethylene and propylene copolymers, polyamides, polyesters and the like, or complex films comprising elementary films of different kinds, for example, a complex film of varnished regenerated cellulose/polyethylene, polyethylene/polyamide, polyethylene/polypropylene, regenerated cellulose/aluminium/polyethylene or the like. The seals of the wrappings made with these films around the article wrapped are formed by hot or cold adhesion but more often by heat sealing, taking advantage of the heat-sealability of wrapping films of polyethylene, varnished regenerated cellulose or the like.

However, in view of the great mechanical resistance of the seals thus formed, difficulties are often experienced when removing the wrapped object from its wrapping, this operation requiring the use of instruments, such as scissors, knives or the like, because the mechanical resistance of the seals and wrapping films is greater than the force which man can normally exert. For certain applications, for example the wrapping of surgical instruments which have to be extracted from their wrappings in an operation theatre, it has been proposed to use films giving a peelable seal, the film being, for example, a special varnished paper. However, these wrappings are not only very expensive but they have, in addition, the drawback of putting cellulose fibres into suspension in the air of the operation theatre, which is detrimental to the sterility of the room. Attempts have been made at overcoming this drawback by using two films of different materials, one being, for example, low density polyethylene, pre-treated with a flame or by corona and the other a polypropylene film. The drawback of this system is that it is restricted to two specific wrapping materials, which cannot meet all possible wrapping applications, particularly when it is desired to make a wrapping which is rigid and highly impermeable to gases.

There is, therefore, a real need for a wrapping material having the property of being weldable by heat or impulse sealing to itself and/or to the most varied wrapping materials, for example, varnished regenerated cellulose, low, medium or high density polyethylene, copolymers of ethylene, propylene, butylene, polypropylene, polybutylene, copolymers of ethylene-vinyl acetate, polyamides, polyesters, varnished aluminium, ionomers, plasticized or non-plasticized polyvinyl chloride, polyvinylidene chloride and the like, while ensuring easy peelability of the seal.

When a heat-sealed joint is made between a plastic film and another plastic film, it is observed that the resistance of the heat-sealed joint varies considerably as a function of the films brought together. Accordingly, as regards the film capable of forming peelable seals considered here, it is necessary that its composition should be modifiable as desired, depending upon the type of film to which it is to be welded so as to be able to regulate adequately the mechanical resistance of the heat-sealed joint, the tearability of the material, its rigidity, its non-permeability to gases and water vapor, its aptitude to laminating, its resistance to fats and solvents, its printability with inks and the like.

If this wrapping material is to come in contact with foodstuffs, it cannot comprise products which are legally prohibited in the countries where it is used.

Finally, according to another aspect, it must be possible for this new wrapping material to be made from starting materials and by a manufacturing process which are economically acceptable in order to extend its use to the greatest possible number of applications.

The present invention relates to the solution of this problem, an object of the present invention being to provide a wrapping film producing a peelable seals, this film being weldable to itself or to any other wrapping material by heat-sealing or impulse sealing techniques.

Thus, according to the present invention, there is provided a film of the following composition:

- about 20 to about 80% by weight of a heat-sealable rigid polymer (A) which, in film form, has an elasticity modulus in excess of 3000 kg/cm$^2$, measured according to the ASTM D 882-27 standard;
- about 0.1 to about 50% by weight of a non-heat-sealable polymer (B) which does not form a solution with the polymer (A);
- about 0.1 to about 30% by weight of a heat-sealable branched olefinic polymer (C) which, in film form, has an elasticity modulus below 3000 kg/cm$^2$, measured according to the ASTM D 882-27 standard; nd
- 0 to about 45% by weight of a polymer (D) compatible with polymers (A), (B) and (C), the total of the constituents (A), (B), (C) and (D) representing 100% by weight of the polymer material of the film.

The present invention also provides a method for the preparation of the above-mentioned new wrapping film, wherein homogenization is carried out in a conventional mixer of a composition containing:

- about 20 to about 80% by weight of a heat-sealable rigid polymer (A) which, in film form, has an elasticity modulus in excess of 3000 kg/cm$^2$, measured according to the ASTM D 882-27 standard;

- about 0.1 to about 50% by weight of a non-heat-sealable polymer (B) which does not form a solution with the polymer (A);
- about 0.1 to about 30% by weight of a heat-sealable branched olefinic polymer (C) which, in film form, has an elasticity modulus below 3000 kg/cm$^2$, measured according to the ASTM D 882-27 standard; and
- 0 to about 45% by weight of a polymer (D) compatible with polymers (A), (B) and (C), the total of the constituents (A), (B), (C) and (D) representing 100% by weight of the polymer material of the film, the composition thus homogenized then being extruded to obtain a film, which is optionally given a surface treatment to make it printable and laminatable.

The heat-sealable rigid olefinic polymer (A) is selected from the class consisting of rigid copolymers and homopolymers of ethylene, propylene, butylene and pentylene, for example, polyethylene with a density in excess of 0.94, polypropylenes, polybutylenes and polypentylenes, as well as polyamides and polyvinyl chloride, as well as physical mixtures thereof. The elasticity modulus of polymer (A) must be in excess of 3000 kg/cm$^2$ according to ASTM D 882-27. It supplies to the film according to the present invention, rigidity, hardness and resistance to oils and fats, as well as heat-sealability. The content thereof represents about 20 to about 80% by weight, preferably approximately 35 to about 75% by weight, of the total of polymers (A), (B), (C) and (D). The resistance of the seal of pure polymer (A) to itself and to certain other thermoplastic films is, however, much too high to give a peelable seal, since this resistance normally reaches at least 800 g/cm. For this reason, polymer (A) must be mixed with the other constituents of the film in accordance with the present invention in order to lower the resistance of the seal to the desired value which, however, must not fall below about 100 g/cm, so that the wrapping obtained with the film according to the present invention has sufficient mechanical resistance where the peelable seals are situated.

The non-heat-sealable polymer (B), which does not form a solution with the polymer (A), is selected from the group consisting of homopolymers of styrene and of styrenes substituted with halogen atoms or alkyl radicals in the side chain or in the nucleus, homopolymers of butadiene, isoprene, isobutylene, acrylonitrile, methacrylonitrile, vinyl chloride, perchlorinated vinyl chloride, vinylidene chloride, acrylic and methacrylic esters of alkanols containing 1 to 4 carbon atoms, or copolymers containing at least two of the monomers listed above, as well as physical mixtures of these homopolymers and/or copolymers.

Polymer (B) has an effect on the peelability of the seal, as well as on its resistance, increasing or decreasing it, according to the nature of the film of plastic material on which it is welded. The amount of polymer (B) added to the composition of the film in accordance with the present invention must, therefore, be adjusted so as to lower sufficiently the resistance of the seal to ensure its peelability, without, however, jeopardizing the mechanical properties of the film obtained, this amount being of about 0.1 to about 50% by weight, preferably about 2 to about 40% by weight, referred to the total content of polymers (A), (B), (C) and (D). Since, in addition to peelability, polymer (B) also ensures the tearability and the hardness of the heat-sealed joint, its content in the composition according to the present invention has to be adjusted, taking these three properties into account.

The branched olefinic polymer (C) is chosen from the group consisting of polyethylenes, the density of which is between 0.915 and 0.935, measured according to the ASTM D 1505-68 and D 792-66 standards. It has the property of improving the flexibility of the film according to the present invention; it reduces, at the same time, the mechanical resistance of the weld and increases the tear-strength. Accordingly, as with polymer (B), it is necessary to introduce polymer (C) into the composition of the film of the present invention, keeping in mind the above-mentioned properties of this polymer; depending upon the specific case, the proportion thereof will be between about 0.1 and about 30% by weight of the total of polymers (A), (B), (C) and (D).

Polymer (D), which is compatible with all the polymers (A), (B) and (C), is selected from the group consisting of copolymers of ethylene, propylene, butylene and pentylene, with at least one monomer selected from the group consisting of isobutylene, butadiene, isoprene, vinyl acetate and acrylic and methacrylic esters of alkanols containing 1 to 4 carbon atoms, as well as previously prepared physical mixtures of a homopolymer of ethylene, propylene, butylene or pentylene with at least one homopolymer of isobutylene, butadiene, isoprene, vinyl acetate or acrylic or methacrylic esters of alkanols containing 1 to 4 carbon atoms. Representative examples of polymer (D) include a physical mixture of low or high density polyethylene with 10 to 50% of polyisobutylene, a physical mixture of low or high density polyethylene with butyl rubber in a 50/50 ratio, a low density copolymer of ethylene and methyl acrylate in a 80/20 ratio. As indicated above, polymer (D) improves the mutual compatibility of polymers (A), (B) and (C) which, in practice, results in a better extrudability of the film; furthermore, it increases the strength and desreases the tearability of the film thus obtained. It makes it possible, therefore, to combat, if need be, an excess of tearability due to the introduction of the polymer (B) and to improve, in that way, the strength of the film capable of forming peelable seals, in accordance with the present invention. The amount of polymer (D) to be introduced into the composition of the film capable of forming peelable seals of the invention may vary between 0 and about 45%, referred to the total weight of polymers (A), (B), (C) and (D).

Polymers (A), (B), (C) and (D) can be used for the preparation of the film according to the present invention in the form of powders or granules.

The film capable of forming peelable seals according to the present invention is either composed exclusively of the three of four above-mentioned polymers or also comprises the additives and/or adjuvants currently used in the manufacture of wrapping films.

Additives may, for example, be added with view to making the film opaque and/or to giving it additional hardness. Talc, titanium dioxide, kaolin, zeolites, silica, micronized mica, zinc oxide, aluminium oxide, natural or precipitated calcium carbonate, magnesium carbonate, barytine or the like, are representative examples of additives which may be used. They can be used in the form of powders, the particle size of which must not be greater than 50 microns, and they can be added to the film composition in quantities varying from 0% to about 45% by weight, referred to the total sum of polymers (A), (B), (C) and (D).

The adjuvants which can be used include thermal stabilizers, for example, diphenyl-thiouree, alpha-phenylindol, barium palmitate and/or stearate, cadmium and/or zinc palmitate and/or stearate, tris-nonylphenyl phosphite and the like; antioxidants, for example, 4,4'-thio-bis-(6-t-butyl-m-cresol), 4,4'-methylene-bis-(2,6-di-t-butyl-phenol), butylated hydroxytoluenes and the like; optical bleaching agents, for example the sulfonated derivatives of stilbene; organic dyes, for example, phthalocyanines, azo dyes, chlorinated indanthrenes and the like; mineral pigments, for example, zinc chromate, cadmium sulfide, iron oxide, antistatic agents and the like; and lubricants, for example, magnesium or calcium stearate, paraffin oil or the like. These adjuvants are added to the composition of the film in an amount of 0 to about 10% by weight, referred to the total sum of polymers (A), (B), (C) and (D).

In order to manufacture a film capable of forming peelable seals in accordance with the present invention, polymers (A), (B), (C) and (D), and possibly the additives and adjuvants, are homogenized at ambient temperature in a mixer of conventional construction, preferably of the conventional rotary type. A considerable advantage of the composition of the film in accordance with the present invention is that it makes it possible to eliminate the calendering and subsequent granulation operations which normally precede extrusion, which constitutes an appreciable saving of equipment and motive power.

A suitable method of homogenization of this mixture is to add the polymers (A), (B), (C) and (D) with a lubricant, such as paraffin oil, in a mixer and then to add to the homogenized mixture thus obtained the additives and adjuvants in powder form.

Another method consists in preparing master batches with at least one of the polymers (A), (B), (C) or (D), the additives and adjuvants, followed by homogenizing the master batches with the remaining polymers (A), (B), (C) or (D). The time required for the homogenization operation is at most 60 minutes and is preferably 10 to 45 minutes.

The homogeneous mix thus obtained is extruded in an apparatus of standard design in which the batch is heated to a temperature reaching a maximum of 290°C. However, while remaining below the temperature limit specified above, there may be temperature gradients from the supply area of the extruder to the final area of the extrusion die.

The extruder may have one or more extrusion screws; it is of importance only in this case that the composition obtained should be perfectly homogeneous on leaving the die.

As is well known, the mechanical properties may be further improved, depending upon whether the extrusion is carried out through a flat die or by extrusion with a blowing technique. In the latter case, the rate of cooling and the rate of blowing may also be modified as a function of the desired aims.

Upon leaving the extruder, the film may be pre-surface-treated with a flame or electric discharge (corona) to make it printable and/or laminatable onto other films.

The film according to the present invention thus obtained may be used as the only wrapping material or it may be used to form complex films by lamination onto other films, such as those made of regenerated cellulose, cellulose acetate, cellulose acetate-butyrate, cellulose propionate, ethyl-cellulose, polyethylene, polypropylene, polybutylene, polypentylene, ethylene-propylene copolymers, halogenated polymers, polyvinylidene chloride, polytetrafluoroethylene, polyvinylidene fluoride, polyvinyl fluoride, rubber hydrochloride polyesters, polyamides, polyurethanes, polycarbonates, polystryene, polyvinyl alcohol, aluminium and its alloys, paper or the like.

As non-limiting examples of uses of the film capable of forming peelable seals according to the present invention, the following may be mentioned:
- Wrappings with barrier properties against water vapor and gases for packing cooked meats, cheeses or the like, composed, on the one hand, of a thermoformable complex, for example, a complex obtained by counter-glueing or by extrusion-lamination of a polyamide (or polyester) film, and of a film of polyethylene, closed and heat-sealed by means of a complex obtained by counter-glueing or extrusion-lamination of the film of the present invention and one or more films with barrier properties, for example, regenerated cellulose, aluminium sheet or the like;
- wrappings for heat sterilization, in water or water steam, of surgical instruments (probes, bandages or the like), composed, on the one hand, of a film according to the present invention or of a complex obtained by counter-glueing or extrusion-lamination of the film capable of forming peelable seals of the present invention and a film of polyamide, polyester, aluminium foil or the like, and, on the other hand, a complex which can withstand relatively high temperatures, with a view to obtaining an adequate sterilization, such as complexes of polyamide/high density polyethylene, polyamide/polypropylene, polyester/high density polyethylene, polyester/polypropylene or the like;
- wrappings for sterilization under ethylene oxide, constituted, on the one hand, by a film of low density polyethylene or polypropylene and, on the other hand, by a film capable of forming peelable seals according to the present invention, alone or forming part of a laminate;
- wrappings for X-ray sterilization composed, on the one hand, of a low density polyethylene film and, on the other hand, of a film capable of forming peelable seals according to the present invention.

The following Examples illustrate various compositions of films capable of forming peelable seals according to the present invention, the films thus obtained and the manufacturing process thereof.

In Examples 1 to 6, use is made of:
a. a conventional rotary mixer for the homogenization of the mixture of the constituents used for making the film capable of forming peelable seals;
b. an extrusion-blowing machine for the extrusion of the mixture thus homogenized as a film having, in each case, a thickness of 80 microns;
c. a "Sentinel Heat Sealer" (Packaging Industries - Montclair, N.J., U.S.A.) for sealability tests;
d. the Elmendorf apparatus for tearability (ASTM D 1922/61T);
e. an electronic traction apparatus giving the modulus of elasticity (as a measurement of rigidity: ASTM D 882-27);

f. A Dart Impact Tester for the measurement of brittleness (impact resistance: ASTM D 1709-67).

Example 7 illustrates two practical ways of wrapping with the film in accordance with the present invention.

In all the Examples, the parts and percentages are by weight.

Table II gives the values of the sealability (in g/cm) and of peelability P (or non-peelability NP) on various plastics films. The dashes mean that sealability could not be schieved. In the sealability column, T is the sealing temperature, $t$ is the sealing time in seconds and $p$ is the sealing pressure in pounds.

TABLE I

| Test No. | (A I) | (A II) | (A III) | (A IV) | (B I) | (C I) | (D I) |
|---|---|---|---|---|---|---|---|
| 1 | 70 (66.7) | — | — | — | 5 (4.8) | 20 (19.0) | 10 ( 9.5) |
| 2 | — | 70 (66.7) | — | — | 5 (4.8) | 20 (19.0) | 10 ( 9.5) |
| 3 | — | — | 70 (66.7) | — | 5 (4.8) | 20 (19.0) | 10 ( 9.5) |
| 4 | — | — | — | 70 (66.7) | 5 (4.8) | 20 (19.0) | 10 ( 9.5) |
| 5 | 35 (50.0) | — | — | — | 5 (7.1) | 20 (28.6) | 10 (14.3) |
| 6 | — | 35 (50.0) | — | — | 5 (7.1) | 20 (28.6) | 10 (14.3) |

For the preparation of the films capable of forming peelable seals in accordance with the present invention, the following polymers are used.

Polymer (A)

A I. = polypropylene of molecular weight $2.1 \times 10^5$, melt index 4 and density 0.89, A II = polybutene of molecular weight $9.7 \times 10^5$ and density 0.87, A III = 6/1 mixture of high density polyethylene (molecular weight $4.5 \times 10^5$, melt index 0.1 and density 0.945) and of polyamide 6 (intrinsic viscosity 1.80 in m-cresol at 20°C.), A IV = 6/1 mixture of high density polyethylene (as in A III) and of stabilized polyvinyl chloride (K value = 58–60), A V = high density polyethylene (as in A III and in A IV).

Polymer (B)

B I = 90/10 styrene-butadiene copolymer (melt index 3.2).

This copolymer, but with a melt index of 14.4 gives practically the same results.

Polymer (C)

C I = low density polyethylene (molecular weight $1 \times 10^6$, melt index 2.4 and density 0.92).

Polymer (D)

D I = mixture of high density polyethylene (molecular weight $4.5 \times 10^5$, melt index 0.1, $d = 0.945$) and of polyisobutylene in the ratio 75/25.

D II = mixture of low density polyethylene with polyisobutylene in a 50/50 ratio (Lupolen 0 250 H) (melt index 1.2–1.7 and density 0.918), D III = copolymer ethylene-butyl acrylate 80/20 (melt index 1.4–2.1 and density 0.926 – 0.930), D IV = copolymer ethylene-vinyl acetate with 18% vinyl acetate (melt index 9 and density 0.94).

EXAMPLE 1

The homogenization is carried out of six compositions for films capable of forming peelable seals in which the nature and quantity of the polymer (A) is varied, whereas the other constituents of the compositions remain constant in nature and quantity, All the polymers are used in granulated form. These homogenized compositions are then extruded into a film.

The composition of the films is given in Table I. The first column gives the number of the test and the other columns the proportions of the various polymers used, the first value being the number of parts by weight and the value in brackets the corresponding percentage by weight.

TABLE II

| Sealability on | 1 | 2 | 3 | 4 | 5 | 6 |
|---|---|---|---|---|---|---|
| low density polyethylene T = 170 – 180°C. t = 0.5 p = 20 | 100 P | 725 P | 320 P | 270 P | 287 P | 625 P |
| high density polyethylene, T = 170 – 190°C. t = 0.5 p = 20 | 387 P | 337 P | 365 P | 330 P | 487 P | 490 P |
| polypropylene, T = 185°C. t = 2 p = 20 | 462 P | 412 P | 260 P | 320 P | 275 P | 283 P |
| polybutene, T = 180°C. t = 1 p = 20 | 150 P | 575 P | — | — | 275 P | 650 NP |
| polyamide 6 (sealing by impulse heat sealing) | — | — | 278 P | — | — | — |
| polyvinyl chloride (sealing by impulse heat sealing) | — | — | — | 325 P | — | — |

These tables show that:

a. on low pressure polyethylene, high pressure polyethylene and polypropylene films, it is easy to achieve a peelable seal, whatever the nature and the amount of the polymer (A);

b. on polybutene, polyamide 6 and polyvinyl chloride films, the nature and amount of polymer (A) have to be chosen specifically;

c. sealability may vary considerably from case to case, while still achieving a peelable seal.

EXAMPLE 2

As in Example 1, the homogenization is carried out of five film compositions in accordance with the present invention, in which the nature and the proportion of the polymers (A), (C) and (D) remain constant, while the amount of polymer (B) is varied.

Table III gives the composition of the films thus obtained.

Table IV gives the value of sealability (in g/cm) on various films of plastic material, peelability (or non-peelability), the tear-strength of the foil with peelable weld in g/foil, as well as impact resistance in g.

TABLE III

| Test No. | (A V) | (B I) | (C I) | (D II) |
|---|---|---|---|---|
| 7 | 70.5 (73.4) | 0.1 ( 0.1) | 19.3 (20.1) | 6.1 (6.4) |
| 8 | 70.5 (70.5) | 4 ( 4.0) | 19.3 (19.3) | 6.1 (6.1) |

TABLE III-Continued

| Test No. | (A V) | (B I) | (C I) | (D II) |
|---|---|---|---|---|
| 9 | 70.5 (66.6) | 10 ( 9.4) | 19.3 (18.2) | 6.1 (5.8) |
| 10 | 70.5 (60.8) | 20 (17.3) | 19.3 (16.6) | 6.1 (5.3) |
| 11 | 70.5 (51.9) | 40 (29.4) | 19.3 (14.2) | 6.1 (4.5) |

TABLE IV

| Sealability on: | 7 | 8 | 9 | 10 | 11 |
|---|---|---|---|---|---|
| low density polyethylene, T = 140°C. t = 1 p = 20 | 275 P | 630 P | 815 NP | 725 NP | 462 P |
| high density polyethylene, T = 160°C. t = 1 p = 20 | 1175 NP | 475 P | 712 P | 887 NP | tear NP |
| polypropylene, T = 180°C. t = 2.5 p = 20 | 142 P | 395 P | 335 P | 425 P | 395 P |
| tear strength | 187 | 202 | 142 | 64 | 21 |
| resistance to impact | 40 | 75 | <30 | <30 | <30 |

These tables show that:

a. depending upon whether the film of the present invention is welded on low density polyethylene, high density polyethylene or polypropylene, sealability and peelability values vary considerably;

b. depending upon the nature of the film upon which it is desired to obtain a peelable seal having a certain weld resistance, the amount of polymer (B) must vary. Thus, for welding on low density polyethylene, the compositions of tests Nos. 7 and 8 are valid, whereas for welding on high density polyethylene, the compositions of tests Nos. 8 and 9 are most suitable. On the other hand, on polypropylene, the amount of the polymer (B) is of secondary importance.

c. as regards tearability, it will be seen that it increases with increasing content of polymer (B) and that the same applies with regard to fragility, expressed by resistance to impact.

TABLE V

| Test No. | (A V) | (B I) | (C I) | (D II) |
|---|---|---|---|---|
| 12 | 70.5 (77.0) | 4 (4.4) | 10 (11.0) | 6.1 (6.8) |
| 13 | 70.5 (73.7) | 4 (4.2) | 15 (15.7) | 6.1 (6.4) |
| 8 | 70.5 (70.6) | 4 (4.0) | 19.3 (19.3) | 6.1 (6.1) |

TABLE VI

| Sealability on: | 12 | 13 | 8 |
|---|---|---|---|
| low density polyethylene, T = 140°C. t = 1 p = 20 | 637 P | 825 P | 630 P |
| high density polyethylene, T = 160°C. t = 1 p = 20 | 1412 NP | 1150 NP | 475 P |
| polypropylene T = 180°C. t = 2.5 p = 20 | 560 P | 500 P | 395 P |
| tear strength | 122 | 145 | 202 |
| impact resistance | 50 | 45 | 75 |
| elasticity modulus | 7400 | 6950 | 6400 |

The above tables show that polymer (C):

a. increases the peelability of the weld;
b. decreases the resistance of the sealed joint;
c. increases the tear strength of the film according to the present invention;
d. increases the flexibility of the film (lowering the elasticity modulus).

EXAMPLE 4

This Example shows the influence of the chemical nature of the polymer (D) upon the properties of the film in accordance with the present invention.

Table VII gives the composition of the constituents of the film, while Table VIII gives the values for the sealability of the seals between the films of the present invention and films of low density polyethylene, high density polyethylene and polypropylene.

These tables show that all these compositions gives peelable joints.

TABLE VII

| Test No. | (A 5) | (B I) | (C I) | (D II) | (D III) | (D I) | (D IV) |
|---|---|---|---|---|---|---|---|
| 14 | 70.5 (57.9) | 20 (16.4) | 19.3 (15.8) | 12 (9.9) | — | — | — |
| 15 | 70.5 (57.9) | 20 (16.4) | 19.3 (15.8) | — | 12 (9.9) | — | — |
| 16 | 70.5 (57.9) | 20 (16.4) | 19.3 (15.8) | — | — | 12 (9.9) | — |
| 17 | 70.5 (57.9) | 20 (16.4) | 19.3 (15.8) | — | — | — | 12 (9.9) |

EXAMPLE 3

This Example shows the influence of the polymer (C) on the properties of the film with peelable seal. In Table V, the composition is given of films in accordance with the present invention in which the polymers (A), (B) and (D) are used in a constant ratio, while the content in polymer (C) is varied.

Table VI gives the values for sealability, peelability, tear strength, impact strength and elasticity modulus (in kg/cm², which is a measure of the flexibility of the film).

TABLE VIII

| Sealability on: | 14 | 15 | 16 | 17 |
|---|---|---|---|---|
| low density polyethylene, T = 140°C. t = 1 p = 20 | 616 P | 662 P | 633 P | 675 P |
| high density polyethylene, T = 160°C. t = 1 p = 20 | 600 P | 700 P | 637 P | 650 P |
| polypropylene, T = 180°C. t = 2.5 p = 20 | 366 P | 400 P | 246 P | 333 P |

Example 5

In this Example, there is varied not the nature but the content of polymer (D), while the nature and the contents of polymers (A), (C) are constant and two different fixed contents have been chosen for the same polymer (B).

Table IX gives the compositions of the films, while Table X shows the results obtained for sealability, peelability, tear strength and impact resistance.

TABLE IX

| Test No. | (A V)       | (B I)     | (C I)       | (D II)    |
|----------|-------------|-----------|-------------|-----------|
| 10       | 70.5 (60.8) | 20 (17.3) | 19.3 (16.6) | 6.1 (5.3) |
| 18       | 70.5 (57.9) | 20 (16.4) | 19.3 (15.8) | 12  (9.9) |
| 11       | 70.5 (51.9) | 40 (29.4) | 19.3 (14.2) | 6.1 (4.5) |
| 19       | 70.5 (49.7) | 40 (28.2) | 19.3 (13.6) | 12  (8.5) |

TABLE X

| Sealability on:                                     | 10        | 18       | 11         | 19        |
|-----------------------------------------------------|-----------|----------|------------|-----------|
| low density polyethylene, T = 140°C. t = 1 p = 20   | 325 NP    | 470 P    | 462 P      | 700 NP    |
| high density polyethylene, T = 160°C. t = 1 p = 20  | 887 NP    | 500 P    | tear NP    | 325 P     |
| polypropylene, T = 180°C. t = 2.5 p = 20            | 425 P     | 340 P    | 375 P      | 445 P     |
| tear strength                                       | 64        | 105      | 21         | 43        |
| impact resistance                                   | <30       | 80       | <30        | 65        |

These tables show that:

a. depending upon the nature of the film upon which the film of the present invention is heat-scaled, polymer (D) gives different results. Thus, on low density polyethylene, it makes the seal peelable when there is little polymer (B) and non-peelable when the concentration in (B) is increased. On high density polyethylene, an increase of the concentration in (D) makes the seal peelable, independently of the concentration in (B). On polypropylene, it reduces the value of the strength of the seal when there is little (B) and increases it contrariwise.

b. an increase of the concentration in polymer (D) increases tear and impact strength, independently of the concentration in polymer (B).

EXAMPLE 6

This Example describes a film composition containing additives and adjuvants. The composition of this film is given in Table XI.

TABLE XI

| Test No. 20: |                                                                |
|--------------|----------------------------------------------------------------|
| 37           | parts (36.8) of (A V)                                          |
| 4.1          | parts ( 4.1) of (B I)                                          |
| 19.4         | parts (19.3) of (C I)                                          |
| 6.1          | parts ( 6.1) of (D I)                                          |
| 20.3         | parts (20.2) of master batch 50/50 of (A V) and calcium carbonate |
| 13.1         | parts (13.0) of master batch 60/40 of titanium dioxide and (C I) |
| 0.5          | parts ( 0.5) of an antistatic agent                            |
| 0.01         | parts (0.01) of an optical bleaching agent.                    |

There is obtained a white opaque antistatic film, giving peelable seals when it is heat-sealed on films of low density polyethylene, high density polyethylene, polypropylene, ethylene-vinyl acetate co-polymer, ionomer(ethylene-acrylic acid salt copolymer) and varnished aluminium.

EXAMPLE 7

Two pratical utilizations are shown here of the film according to the present invention.

a. For packing in bags medical probes which must be sterilized in an ethylene oxide atmosphere, use is made, one one side of the packing, of a complex composed of a varnished film of regenerated cellulose (23 microns thick) and of a film according to the invention (30 microns thick), while on the other side of the packing, there is used a single film of low density polyethylene of 50 microns which has a high gas permeability. The final dimensions of the packing bag are 8 × 25 cm., the opening of the bag being made on the 8 cm. wide side. It is, therefore, possible to use a film capable of forming peelable seals, the strength of the weld of which is relatively high, for example the film described in Example 3, test 12.

b. To wrap cooked meats in heat-formed dishes, consisting of a 40 micron thick polyamide film laminated on a 60 micron thick polypropylene film, there is used, as covering film, a complex composed of a varnished printable film of regenerated cellulose of 23 micron thickness laminated on a film capable of forming peelable seals in accordance with the present invention of 30 microns thickness. Since the dimensions of this pack are 20 × 25 cm. and since the opening has to be made on the 20 cm. side, the resistance of the joint cannot be as high as in Example 7a); therefore, the film capable of forming peelable seals chosen will be one of the films Nos. 8 or 9 given in the Tables of Example 2.

I claim:

1. A wrapping film capable of forming peelable seals comprising about 20 to about 80% by weight of a heat-sealable rigid polymer (A) which, in film form, has an elasticity modulus in excess of 3,000 kg/cm$^2$, measured according to ASTM D 882-67 standard, said polymer (A) being polyethylene having a density in excess of 0.94, polypropylene, polybutene or a physical mixture of said polyethylene with polyamide or polyvinyl chloride in which the weight ratio of polyethylene to polyamide or polyvinylchloride is about 6:1, about 0.1 to about 50% by weight of a non-heat-sealable polymer (B), which does not form a solution with polymer (A), said polymer (B) being a styrene-butadiene copolymer, about 0.1 to about 30% by weight of a heat-sealable branched chain polymer (C) which, in film form, has an elasticity modulus below 3,000 measured according to ASTM D 882-67 standard, said polymer (C) being a polyethylene having a density between 0.915 and 0.935 and 0 to about 45% by weight of a polymer (D) compatible with polymers (A), (B) and (C), said polymer (D) being an ethylene-alkylacrylate copolymer, wherein the alkyl group contains 1–4 carbon atoms, an ethylene-vinylacetate copolymer or a previously prepared mixture of polyethylene with polyisobutylene, the sum of the polymers (A), (B), (C) and (D) representing 100% by weight of the polymeric material of the film.

2. A wrapping film according to claim 1, wherein polymer (D) is a mixture of low or high density polyethylene with 10 to 50% by weight of polyisobutylene.

3. A wrapping film according to claim 1, comprising in relation to the sum of polymers (A), (B), (C) and (D), 0% to about 45% by weight of mineral fillers and 0% to about 10% by weight of adjuvants conventional for wrapping films.

4. A wrapping film according to claim 3, wherein the adjuvants are selected from the group consisting of thermal stabilizers, antioxidants, optical bleaching agents, organic dyes, mineral pigments, antistatic agents and lubricants.

5. A wrapping film according to claim 1, wherein polymer (A) is polyethylene having a density in excess of 0.94.

* * * * *